A. C. GRIFFING.
TRAP.
APPLICATION FILED APR. 30, 1915.

1,157,382.

Patented Oct. 19, 1915.
2 SHEETS—SHEET 1.

WITNESSES:

INVENTOR
ASA C. GRIFFING,
BY
ATTORNEYS

A. C. GRIFFING.
TRAP.
APPLICATION FILED APR. 30, 1915.
1,157,382.
Patented Oct. 19, 1915.
2 SHEETS—SHEET 2.
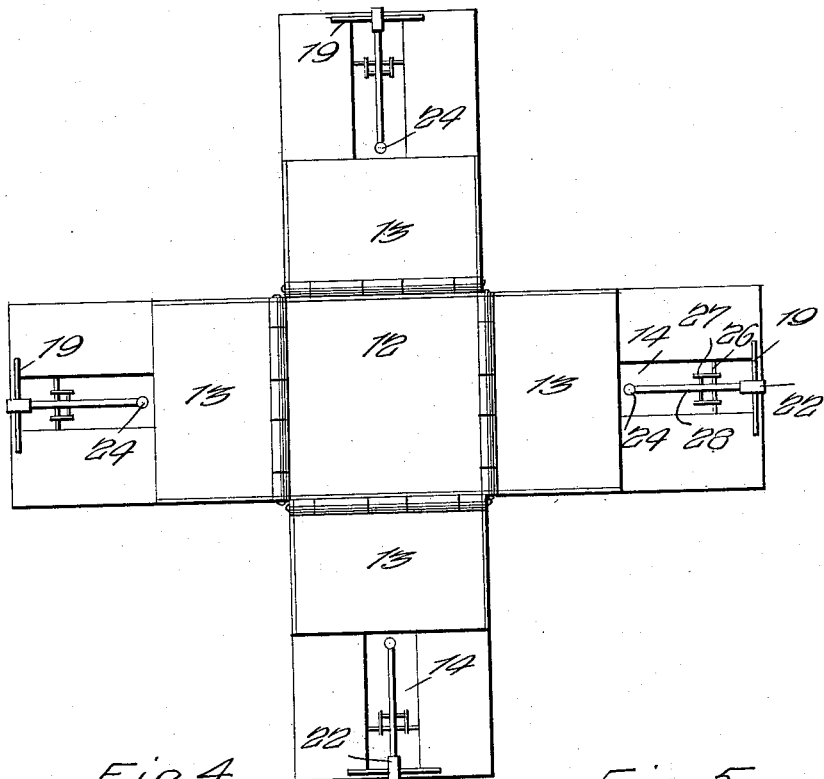
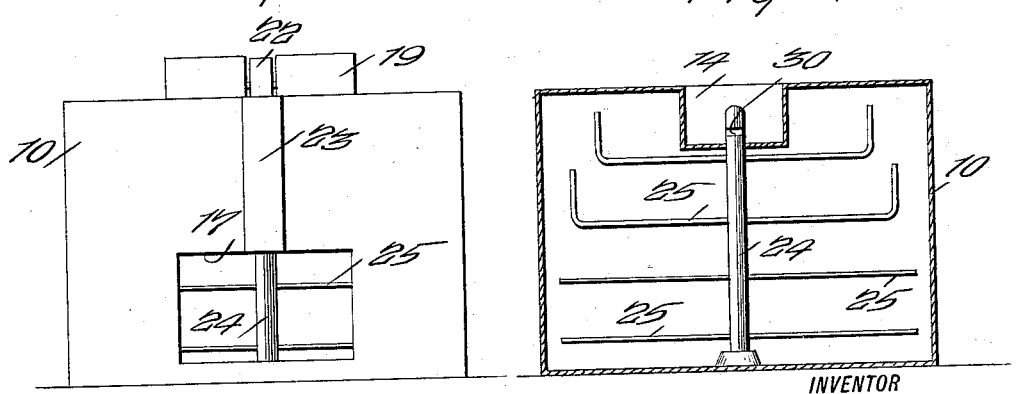
WITNESSES:
INVENTOR
ASA C. GRIFFING,
BY Munn & Co.
ATTORNEYS

UNITED STATES PATENT OFFICE.

ASA CYRUS GRIFFING, OF BASKIN, LOUISIANA.

TRAP.

1,157,382.　　　Specification of Letters Patent.　　Patented Oct. 19, 1915.

Application filed April 30, 1915.　Serial No. 24,880.

*To all whom it may concern:*

Be it known that I, ASA C. GRIFFING, a citizen of the United States, and a resident of Baskin, in the parish of Franklin and State of Louisiana, have invented an Improvement in Traps, of which the following is a specification.

The present invention relates to animal traps, and more particularly to a trap adapted to encage the animal without injury to the same.

The primary object of the invention is to provide a trap consisting of a trip mechanism of novel construction operated by the entry of the animal into the trap to close the entrance thereto and prevent escape therefrom. Another object of the invention is the provision of a trap which is simple in construction, efficient, durable, and one which may be manufactured at a minimum cost.

The inventive idea involved is capable of receiving a variety of mechanical expressions, some of which, for the purpose of illustrating the invention, are shown in the accompanying drawings, in which—

Figure 1:
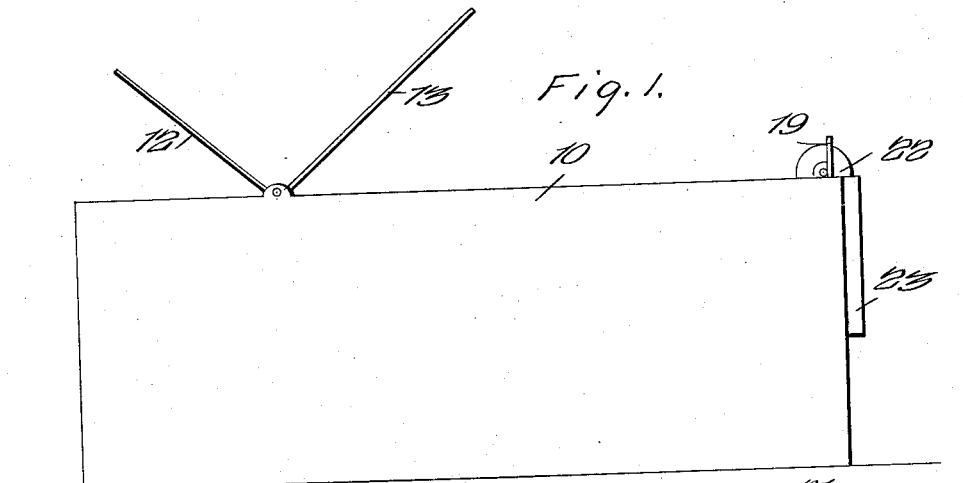
Figure 2:
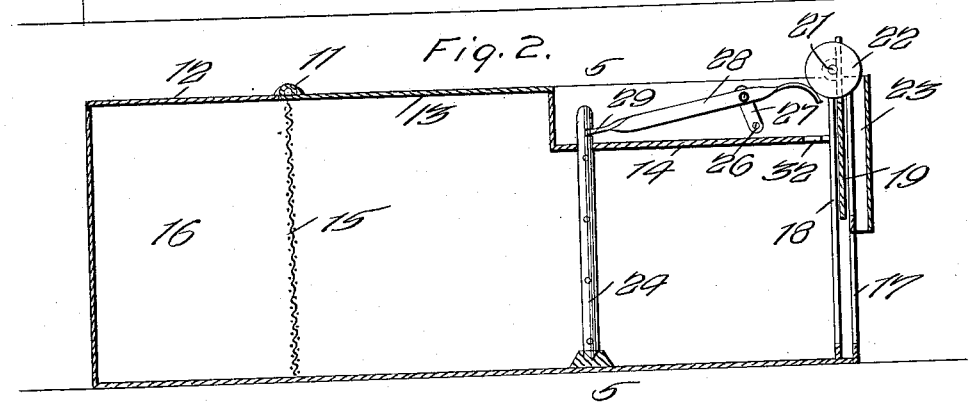
Figure 3:
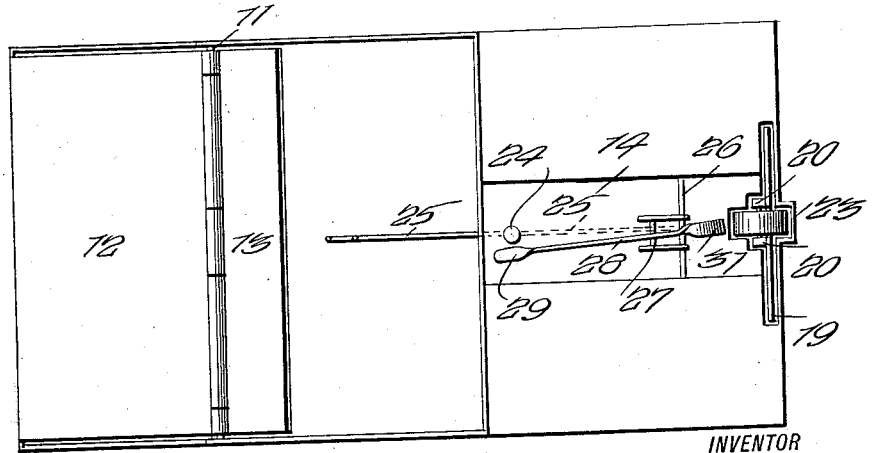

Figure 1 is a side elevation of the trap constructed in accordance with the invention. Fig. 2 is a vertical longitudinal sectional view thereof. Fig. 3 is a top plan view. Fig. 4 is an end elevation. Fig. 5 is a section on the line 5—5 of Fig. 2. Fig. 6 is a modification showing a plurality of individual traps secured together.

Referring more particularly to the accompanying drawings in which like reference characters indicate similar parts, the numeral 10 indicates the casing of the trap having a hinge member 11 secured thereto and adapted to receive thereon the oppositely extending covers 12 and 13 which form a portion of the top of the casing. Forwardly of the cover 13, the casing is provided in its top with an elongated longitudinally extending depressed portion 14 adapted to receive therein the trip mechanism which will be presently described. The interior of the casing is divided into compartments by a wire partition 15 mounted therein below the hinge member 11, the compartment 16 being adapted for the reception of bait, live or otherwise. The front end of the casing 10 is provided with an opening 17 through which an animal may enter the trap. The front end of the casing has secured to its interior side the oppositely disposed guide flanges 18 arranged on each side of the opening 17 and adapted to receive therebetween the vertically movable closure 19 which is maintained in an elevated position when the trap is set. The upper end of the closure 19 is provided with a slot on each side of which are formed small ears 20 adapted to receive a spindle 21 upon which is mounted a small wheel or roller 22 for a purpose which will presently appear. Formed on the exterior of the front of the casing is an outstanding portion 23 which forms a channel for the roller 22, said portion terminating at its lower end at a point above the opening 17.

At a point intermediate the side walls of the casing and adjacent the opening 17, said casing has mounted and adapted for rotation therein a vertical shaft 24, the upper end of which projects through the bottom of the depressed portion 14 of the casing. Shaft 24 has secured thereto a plurality of laterally extending wire members 25 which form a swinging gate, the upper members 25 being bent at their ends as indicated in Fig. 5.

Intermediate the ends of the depressed portion 14 the same has mounted therein a small transverse shaft 26 upon which is secured a crank 27 adapted to have loosely mounted thereon a longitudinally extending trip member 28, having a slight lateral movement, the rear end of which is twisted to form a flat portion 29 adapted to engage in a notch 30 formed in the shaft 24 adjacent the upper end thereof when the trap is in set position, as illustrated in Fig. 2. The forward end of the trip 28 is also twisted to form a downwardly curved portion 31 the upper surface of which is engaged by the roller 22 carried by the closure 19 so that the latter is held in its elevated position. The bottom of the depressed portion 14 is cut away at its forward end as indicated at 32 to permit of the passage of the roller when the closure is moved up and down.

In practice, the parts are adjusted to the position shown in Fig. 2 in which position the trap is set and ready to encage an animal entering through the opening 17. The animal will strike the bent members 25 in its endeavor to reach the bait in the compartment 16 and cause said members to swing, thereby rotating the shaft 24. Movement of this shaft will cause the notch 30 therein to disengage the end 29 of the trip 28 and shift said end slightly to the side, as indicated in Fig. 3 of the drawing. The end 29 being free from the shaft will be forced rearwardly by reason of the weight of the roller 22 on the curved end 31 of the trip, said movement being caused by the crank connection 27 between the trip and the shaft 26. This rearward movement of the trip 28 will withdraw the end 31 from beneath the roller 22 and permit the closure 19 to drop, by reason of its end weight, to a closing position, thereby preventing the escape of the animal through the opening 17.

In Fig. 6 there is shown a modification of the invention in which a plurality of individual traps are secured together and have a common bait compartment and cover therefor. Each individual portion of the trap, as shown in Fig. 6, is identical in construction with the trap illustrated in Figs. 1 to 5, the purpose of securing a number of these traps together obviously being to encage as many animals as possible.

I claim:—

1. A trap comprising a casing having an entrance therefor and a depressed portion located in the top thereof, a closure for said entrance, a roller carried by said closure, a crank shaft mounted transversely of said depression, a trip arm carried by said crank shaft, one end of said arm being adapted to engage said roller to retain the closure in an elevated position, a shaft rotatably mounted in said casing adjacent said entrance and provided with a notch in the upper end thereof adapted to receive the other end of said trip arm when the closure is in elevated position, and gate members carried by said shaft and adapted to rotate the same to release said notch from engagement with the trip arm thereby permitting the closure to move to the closing position.

2. A trap comprising a casing having hinged covers therefor and a longitudinal depression in the top thereof, said casing being also provided with an opening to form an entrance, a vertically movable closure for said entrance, guides for said closure, a roller carried by said closure, a crank shaft mounted in said depression, a trip arm carried by said shaft, one end of said arm being adapted to engage said roller to retain the closure in an elevated position, a vertical shaft rotatably mounted in said casing adjacent the opening therein, the top of said shaft extending into said depressed portion and being provided with a notch adapted to receive the other end of said trip arm, and gate members carried by said shaft and adapted to rotate the same to release said notch from engagement with the trip arm to permit the closure to move to a closing position.

3. A trap comprising a casing having an entrance and a depressed portion, a closure for said entrance, a gate in said casing, and means mounted in said depressed portion and actuated by the movement of said gate to release said closure.

4. A trap comprising a casing having an entrance and a depressed portion, a closure for said entrance, a gate in said casing, and pivoted means mounted in said depressed portion and actuated by the movement of said gate to release said closure.

5. A trap comprising a casing having an entrance, a closure therefor, an animal actuated member adapted for horizontal rotation in said casing, and a pivoted trip mechanism engaging said member and operated by the rotation thereof to release said closure.

6. A trap comprising a casing having an entrance, a closure therefor, an animal actuated member mounted in said casing, and means pivoted to the casing and movable longitudinally thereof for releasing said closure.

7. A trap comprising a casing having an entrance, a closure therefor, an animal actuated member mounted in said casing, and means pivoted to the casing and movable longitudinally thereof and operated by the actuation of said animal actuated member for releasing said closure.

8. A trap comprising a casing having an entrance, a closure therefor, an animal actuated member mounted in said casing, means pivoted to the casing and movable longitudinally thereof for releasing said closure, and means carried by the closure for moving said pivoted means.

ASA CYRUS GRIFFING.

Copies of this patent may be obtained for five cents each, by addressing the "Commissioner of Patents, Washington, D. C."